US008315722B1

(12) United States Patent
Russo (10) Patent No.: US 8,315,722 B1
(45) Date of Patent: Nov. 20, 2012

(54) ADVANCED FANTASY SPORTS COMPETITION HAVING USER-DRAFTED AND SYSTEM-GENERATED FANTASY TEAMS

(76) Inventor: Stan Russo, Mount Vernon, NY (US)

(*) Notice: Subject to any disclaimer, the term of this patent is extended or adjusted under 35 U.S.C. 154(b) by 0 days.

(21) Appl. No.: 13/180,210

(22) Filed: Jul. 11, 2011

(51) Int. Cl.
   - G06F 19/00 (2006.01)
   - A63F 9/24 (2006.01)
   - A63F 13/00 (2006.01)

(52) U.S. Cl. ............... 700/91; 463/4; 463/9; 463/42
(58) Field of Classification Search .......... 700/91–93; 463/2, 4, 9–10, 16, 25, 29, 40–42
See application file for complete search history.

(56) References Cited

U.S. PATENT DOCUMENTS

| | | | |
|---|---|---|---|
| 4,918,603 A | 4/1990 | Hughes et al. | |
| 5,846,132 A * | 12/1998 | Junkin | 463/42 |
| 6,236,900 B1 | 5/2001 | Geiger | |
| 6,371,855 B1 * | 4/2002 | Gavriloff | 463/42 |
| 6,669,565 B2 * | 12/2003 | Liegey | 463/42 |
| 6,688,978 B1 * | 2/2004 | Herman | 463/25 |
| 7,614,944 B1 * | 11/2009 | Hughes et al. | 463/4 |
| 7,618,312 B1 * | 11/2009 | Kasten | 463/7 |
| 8,099,182 B1 * | 1/2012 | Kasten | 700/91 |
| 2002/0107590 A1 * | 8/2002 | Liegey | 700/91 |
| 2004/0266530 A1 | 12/2004 | Bishop | |
| 2004/0266535 A1 * | 12/2004 | Reeves | 463/42 |
| 2005/0164792 A1 * | 7/2005 | Wilcock | 463/42 |
| 2006/0040719 A1 * | 2/2006 | Plimi | 463/9 |
| 2006/0100006 A1 | 5/2006 | Mitchell et al. | |
| 2006/0217198 A1 * | 9/2006 | Johnson | 463/40 |
| 2006/0252476 A1 * | 11/2006 | Bahou | 463/4 |
| 2007/0060325 A1 | 3/2007 | Gradek | |
| 2007/0185599 A1 * | 8/2007 | Robinson et al. | 700/92 |
| 2007/0203591 A1 * | 8/2007 | Bowerman | 700/90 |
| 2007/0243918 A1 * | 10/2007 | Wojewoda et al. | 463/9 |
| 2008/0026846 A1 | 1/2008 | McMaster | |
| 2008/0287198 A1 * | 11/2008 | Callery et al. | 463/42 |
| 2009/0045581 A1 * | 2/2009 | Cornelio | 273/461 |
| 2009/0069089 A1 * | 3/2009 | Piccioni et al. | 463/42 |
| 2009/0270172 A1 * | 10/2009 | Sorrells et al. | 463/42 |
| 2010/0137057 A1 * | 6/2010 | Fleming | 463/25 |
| 2010/0203935 A1 * | 8/2010 | Levy et al. | 463/4 |
| 2010/0203936 A1 * | 8/2010 | Levy et al. | 463/4 |
| 2010/0285856 A1 * | 11/2010 | Thomas | 463/3 |
| 2011/0256909 A1 * | 10/2011 | Sloan et al. | 463/1 |

* cited by examiner

Primary Examiner — Milap Shah
(74) Attorney, Agent, or Firm — Goldstein Law Offices, P.C.

(57) ABSTRACT

A system and method for playing fantasy sports that replicates league competition for an individual user by competing in a simulated league against a plurality of system-generated teams, followed by competing in an elimination round and a plurality of tournament rounds against other users. The user can field more than one team, but each team competes in a different system-generated simulated league. The user selectively drafts a roster based on real players in a sport and the system randomly generates a plurality of rosters to complete a league schedule congruent with the sport season. At the conclusion of the schedule, at least a designated percentage of users having the best win record compete in a pool against each other in an elimination round. A plurality of top scoring users in the elimination round win a berth in a championship tournament using single elimination rounds to determine a champion.

17 Claims, 12 Drawing Sheets

ADVANCED FANTASY SPORTS COMPETITION HAVING USER-DRAFTED AND SYSTEM-GENERATED FANTASY TEAMS

BACKGROUND OF THE INVENTION

The invention relates generally to a system and a method for playing fantasy sports. More particularly, the invention relates to an advanced system and method for playing fantasy sports that replicates league competition for a single user during a season of play by competing in a simulated league.

Watching teams of athletes compete in various sports is a popular pastime throughout the world. Many spectators enjoy second-guessing managers and coaches during and after a game, giving rise to the term "Monday Morning Quarterback." Back in the 1980's, baseball fans and sports writers created the concept of a fantasy game, where the participants act as owners, managers and coaches. The participants build a team by picking real individual players through a draft, create a "dream" roster, trade, cut and recruit other players to that roster in coordination with the other participants. Participants must join a league with other participants in order to conduct these transactions in a realistic manner. Participants play against each other in pairs, and the winner is determined by taking the statistics of how the real player performed in actual play that week and tally the score based on the roster of starting players created by the participant for that week. Fantasy sports started before the Internet was widely accessed for sports statistics, so the scoring was based on simple calculations and the participants combing newspapers for the appropriate daily statistics.

Fantasy sports leagues have expanded from baseball into every professional team sport, such as football, soccer, hockey, and rugby. A modified version of the game has been developed for players to predict Supreme Court decisions. The ubiquity of computing devices and access to the Internet has allowed this form of entertainment to explode. Participants form a league and enter their picks into a website that then gathers player statistics after each real game to almost instantly calculate scores in the fantasy league, allowing the participants to track standing in their league, make trades, adjust rosters, cut players and sign players within the pool of real players in their fantasy league.

Gradek (U.S. Patent Application Publication 2007/0060325) discloses a method to calculate the score in fantasy sports using a live feed server and an application through the user pulling the statistics to calculate the scores. Hughes et al. (U.S. Pat. No. 4,918,603) discloses a draft for fantasy football using real players and scoring the players weekly to establish standings. Bishop (U.S. Patent Application Publication 2004/0266530) discloses a system for duals between owners of fantasy teams over a local area network (LAN) rather than through the Internet.

A fantasy sports league is just one form of online game playing available through the Internet. McMaster (U.S. Patent Application Publication 2008/0026846) describes a structured approach for multi-player on-line gaming that qualifying a player for regular play, tournaments and finals. The system includes scheduling time slots for the competition and selecting a host computer.

Mitchell et al. (U.S. Patent Application 2006/0100006) discloses an online game using points and bidding for predicting real life events that goes beyond sports competition. Similarly, Geiger (U.S. Pat. No. 6,236,900) discloses an online competition for points that are awarded for correcting predicting outcomes of sports, politics and other contests.

All of these gaming systems for fantasy sports require that a participant be part of a league with other participants in order to simulate real life competition. Additionally, since there must be at least one other participant, with some systems requiring a total of twelve participants, the league does not form until the required number is reach and sometimes leaving some people who want to participate waiting for the next season to play. Often times, a participant with superior knowledge and instincts may desire a more challenging approach than against the league that he or she is enrolled in. None of the systems presented meet this challenge to provide a gaming system that either tests and stretches the experienced player or does not require the games be played in a multi-player mode.

While these units may be suitable for the particular purpose employed, or for general use, they would not be as suitable for the purposes of the present invention as disclosed hereafter.

SUMMARY OF THE INVENTION

It is an object of the invention to produce a system and a method of playing fantasy sports that is challenging to a user. Accordingly, the invention is a system and a method of playing fantasy sports that allows a user to draft a team of players and compete against a challenging system-generated team without cutting or signing a player through a season of play.

It is another object of the invention to produce a system and a method of playing fantasy sports that allows a user to experience league play without joining or forming a league. Accordingly, the invention is a system and a method of playing fantasy sports that allows a user to compete in a league with a plurality of teams in a simulated league, the teams system-generated and not formed by other users.

It is a further object of the invention to produce a system and a method of playing fantasy sports that allows a user to compete with other users who have the best records, the other users competing against teams in other system-generated simulated leagues. Accordingly, the invention is a system and a method of playing fantasy sports that has an elimination round of play after league play is complete, the elimination round including at least a top designated percentage of users with the best records in the system to win a berth in final tournament.

It is yet a further object of the invention to produce a system and a method of playing fantasy sports that allows a user to compete in a match against another user selected from among other users who have the best records. Accordingly, the invention is a system and a method of playing fantasy sports that has a championship tournament after the elimination round is complete, the tournament having a roster of thirty-two matches of top users competing in a single elimination bracket format to determine an ultimate season champion.

It is yet another object of the invention to produce a system and a method of playing fantasy sports that allows a user to compete in a system that is more challenging to the user by having unpredictable and random elements. Accordingly, the invention is a system and a method of playing fantasy sports that randomly selects a roster for the user, the randomly selected roster challenging the user to play the roster through a season without trading, cutting or signing a player to the roster.

The invention is a system and method for playing fantasy sports that replicates league competition for an individual user by competing in a simulated league against a plurality of system-generated teams, followed by competing in an elimination round and a plurality of tournament rounds against other users. The user can field more than one team, but each team competes in a different system-generated simulated league. The user selectively drafts a roster based on real individual players in a sport and the system randomly generates a plurality of rosters to complete a league schedule congruent with the sport season. At the conclusion of the schedule, at least a designated percentage of the users having the best win record compete in a pool against each other in an elimination round. A plurality of top scoring users in the elimination round win a berth in a championship tournament using single elimination rounds to determine a champion.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 3:
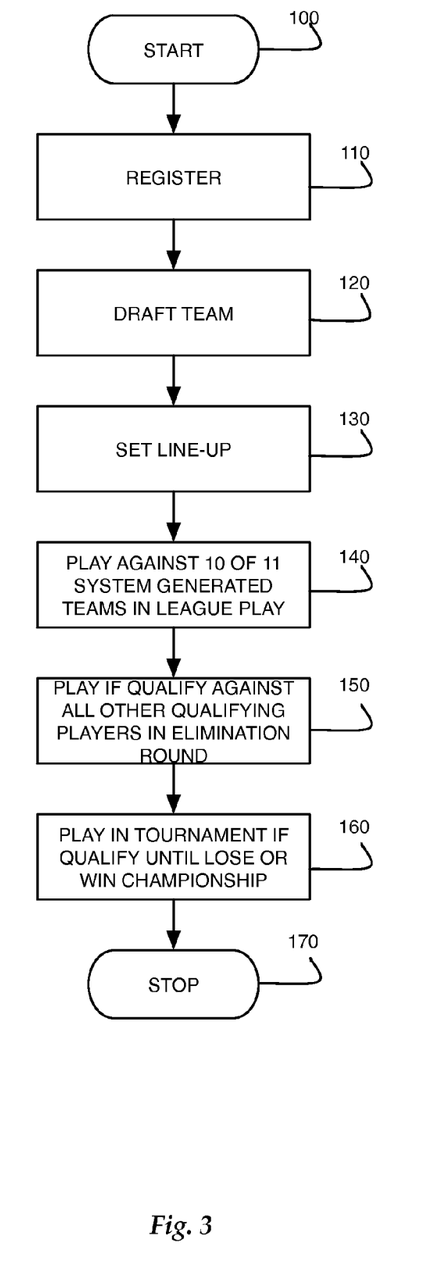
FIG. 3 is a flow chart showing a plurality of user actions in the fantasy sports system.

FIG. 3 illustrates a flow chart showing a plurality of actions performed in a fantasy sport system. The system uniquely allows a single user to participate in a fantasy sport league without forming or creating a league with other players. To the user, the actions are similar to actions taken by any user in a fantasy sport system. However, distinguishing the system disclosed herein, the user competes against a plurality of teams in a simulated league that are randomly generated by the system through a draft process 120. Unlike other systems currently known among participants in fantasy sports that perform mere scoring and record keeping functions, the system of the invention participates in the competition as explained hereinbelow. Further distinguishing an embodiment of the system is the restriction of further cutting or signing players after season play begins. The user, as well as the system-generated teams, is restricted to using the roster originally drafted before a sport season begins.

Throughout this discussion, professional football, as it is known in the United States, with its season, teams and players and fantasy football, which is based on the United States professional football sport, will be used as an example to illustrate the system and the method of play. When referring to the actual professional sport that is played by players and teams of the National Football League® (National Football League® is the registered service mark of the National Football League Association, New York, N.Y.), the term real will be used to distinguish elements that are common in professional sports and fantasy sports. It is well understood by those of ordinary skill that the system and the method herein disclosed is useful for any professional team sport, such as, for example, and not limited to, football, baseball, basketball, soccer, rugby and hockey. Modifications of the system and method to easily adapt to these sports are within the inventive concept.

The user initiates play and starts 100 before the formal season of play in the real professional league by launching the website of the invention in a web browser on a computing device. The user registers for the season 110, assigning a team name and selectively supplying a method of payment for participation by entering the required responses into the website. The user drafts a team 120 and creates a team roster, which is described in detail hereinbelow. Once the user has a complete roster and prior to the first game of the real league, the player selects a starting line-up from among the user's team roster 130. The system has drafted eleven teams concurrently and created eleven team rosters, completing the simulated league. For every user, the system creates a unique set of eleven team rosters. If a user selects to play with more than one team, the system creates unique sets of eleven team rosters for each team the user creates. The system randomly selects a team and creates a starting line-up to play against the user's team. Play is based on the system collecting the statistics for all of the players in the real league, calculating the points for each player, summing the points for all of the players on a team starting line-up. The winner is the team having the higher number of points between the user and the randomly selected team. The scoring in fantasy sports is well-known to those of ordinary skill and is beyond the scope of this discussion. Play continues throughout the next nine weeks of the real football season, the system assigning one of the remaining eleven teams to play opposite the user's team. Every week the user selects the starting line-up for the competition.

At the conclusion of ten weeks of competition, the user, if eligible, plays in an elimination round against a pool of other users 140. The system selects among all users, top players having a win-loss record of 8-2 or better during the season. If less than twenty-five percent of all users do not have a win-loss record of 8-2 or better, the system selects from the other users, based on various ranking techniques until the elimination round has a minimum of twenty-five percent of all users. If more than twenty-five percent of all users have a win-loss record of 8-2 or better, all are eligible for the elimination round. If the user does not qualify as a top player for play in the elimination round, the season and play ends for the user after ten rounds of competition against system-generated teams. It is understood the twenty-five percent and 8-2 win-loss record are non-limiting examples for the purpose of illustration and the percentage of user and the win-loss record requirement can be designated and adjusted to provide a challenging pool of users.

The user competes against the pool of top users in the elimination round and the system calculates the score for each user. The system selects sixty-four of the highest scoring top players for the tournament as finalists. The user, if qualified advances to the tournament 160. Only sixty-four of the top players from the elimination round become one of the finalists. If the user does not qualify as a finalist for play in the tournament round, the season and play ends for the user after the elimination round of competition against the pool of top player users.

The system creates thirty-two pairs in a single elimination format, assigning the pairs each to a berth, with the finalist with the highest score in the elimination round plays the finalist ranking sixty-fourth, the finalist ranking second, plays against the finalist ranking sixty-third. The teams play in pairs, one user against the other in a single elimination format in a plurality of championship rounds, the user eliminated from the tournament after a single loss. Once a user loses a tournament game, play and the season ends for the user. Play continues for six rounds, the winners advancing to the next round until two finalists remain, playing against each other in the final round for the championship. See FIG. 11 for a display of an exemplary tournament page in the fantasy football website, showing the last four championship rounds leading to the final round in single elimination bracket system. The single elimination format is well-known among those of ordinary skill and a further detailed description is beyond this discussion. The final championship round coincides with the last game of the regular season of real football. Once the winner of the championship game is determined and declared a champion, the season of fantasy football ends, the champion having successfully competed against system-generated teams for ten rounds 140, competed against the pool of all top player users in the elimination round 150, and advanced against the finalists in the six tournament rounds 160, mixing play against system-generated teams and high quality human created teams that qualify for advancement in a single sport season.

Figure 5:
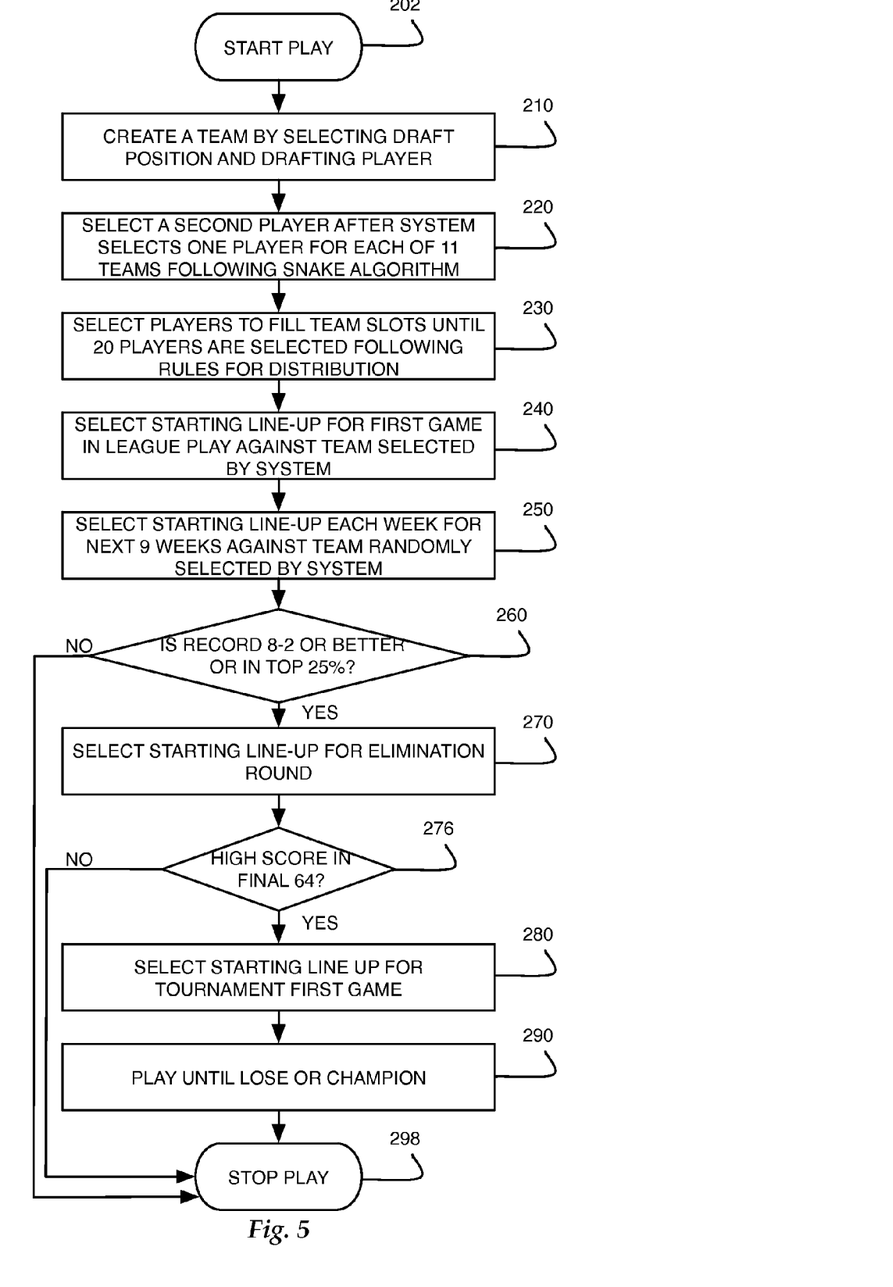
FIG. 5 is a flow chart showing the actions of a user creating a team and moving through a plurality of levels of competition in the fantasy sports system.

FIG. 5 demonstrates a flowchart in detail for a drafting process and a playing process in a first embodiment of the invention. The user starts play 102 after registering by creating the team roster through a draft as explained hereinabove. The user chooses a draft order position, from one (1) to twelve (12). If the user does not choose the first position, the system begins drafting one player for each team in a random order until reaching the draft order position of the user, the user selectively drafts a player from a pool of all players playing in the real professional sport. The system continues drafting one player for each team until all twelve teams has one player, completing a first round. The system selectively drafts players according to an algorithm, the algorithm using the ranking of the players and artificial intelligence. The system randomly selects how each pick is calculated, determining whether for any one pick, whether it will be the top ranking player left in the pool of players, the player ranking a single rank less than top, ranking further down in the rankings, adjusting the ranking by which players have been taken take off the board by previous draft picks, based on a numerical average system. At any time, the system selects one of three players, the top player, the second ranked player or the third ranked player left on the board, until the time when specific slots need to be filled and then those variations are overridden by the need to fill slots on the team. The algorithm rapidly fills the rosters of the other eleven teams so that the draft process for the system teams appears instantaneous. In one example, drafting follows what is known as the serpentine pattern, wherein the team that picked first in the first round, picks last in the second round, the team that picked second in the first round, picks eleventh in the second round and so forth. The serpentine pattern draft is well-known to those of ordinary skill and further explanation of the process is beyond the scope of this discussion. The user and system continues the drafting process as described hereinabove until twenty players are in each team roster 220. Because the system follows a plurality of set algorithms to fill the rosters 220, selections are rapid and the user determines how fast the draft step is complete by how fast the user decides the draft picks for the user's team. The system of the invention does not require the user wait for eleven other users to select draft picks. The user completely controls the length of the drafting process.

A unique feature of the system in a first embodiment is that the user must fill the team roster completely through the drafting process, the system not incorporating free agency or trades. For this reason, rosters must be filled during the draft process to ensure each team is formulated to have an adequate number of players necessary to protect against player injuries and ensure, within reason, the capability to field a full starting line-up to compete on a weekly basis. The system requires that each team, both the team drafted by the user and the eleven teams drafted by the system have a proper distribution of players. As a non-limiting example, one distribution requirement includes two quarterbacks, four running backs, four wide receivers, two tight ends, two kickers and two defenses, totaling sixteen players and making a minimum distribution requirement. The user and the system selectively choose four additional players past the requirements at any one position or a combination of four additional positions at two or three positions, creating a maximum distribution. Once a user selectively chooses players for a position that is at the maximum distribution, the system locks out the user from selecting any additional players for that position.

Once the user has drafted twenty players, following the requirements for distribution of positions 230, the user selects a starting line-up for a first game. The system randomly selects one of the eleven system teams for the first game, and the system randomly selects a starting line-up from the roster of the selected team 240. Each of the following weeks, the user selects the starting line-up of the user's team 250, based on eligibility of the real players for play. Because the system does not permit changes to the roster after the draft, the user cannot cut an ineligible player or sign other players to replace the ineligible player. The ineligible player remains on the roster throughout the season. The system randomly selects one of the remaining teams each week, assigns the team to compete against the user and creates a starting line-up for the team 250.

The user can register for more than one team. However, each team competes against a different set of system-generated teams. If the user selects the same players for each team, the system selects eleven different teams for each of the user's teams. The system accomplishes the variation through the algorithm that randomly chooses the ranking of the player that is selected in each round.

Each user team compiles a win-loss record in a first stage of competition, the first stage, stage one, covering the first ten games of the season. The standing of the user team is determined by the outcomes of the stage one games against the system-generated teams. The compilation of win-loss record in association with total points scored and a defined tie-breaking system determines whether the user progresses to a second stage, stage two. After the ten weeks of play, the system compiles the points and win-loss records and determines the users selected from among a pool of all users in the system, the selected users having a record of eight wins and two losses or better for the season to automatically continue play in the elimination round in stage two. If less than a designated percentage of the pool of all users in the system have a record of eight or more wins, the system ranks the remaining users using a defined qualification scoring system and selects the highest ranking user teams among those with seven or fewer wins, until the designated percentage of the pool of all users is eligible for the elimination round. If the user team qualifies by win-loss record or by ranking in the designated percentage 260, the user selects the starting line-up for the elimination round 270. In FIG. 5, twenty-five percent has been used as a non-limiting example for the designated percentage in determining eligibility for stage two 270. If the user's team does not qualify, the user stops play 298 for the season. It is understood that no system created team advances to stage two regardless of win-loss record.

Figure 10:
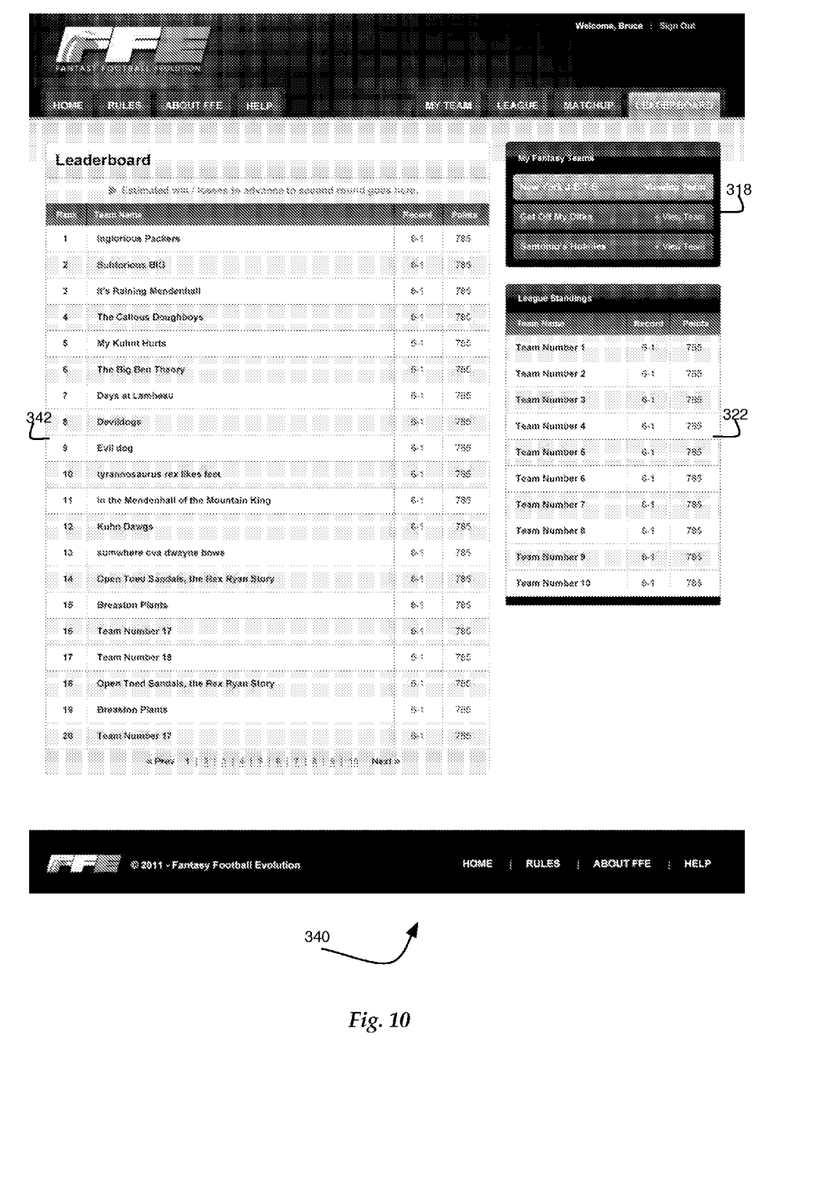
FIG. 10 is a display of an exemplary leaderboard page in the fantasy football website, showing the listing of team standings for an elimination round.

Each week after play is complete during stage one, users can review the overall standings and determine if the user team or in the case of place compared to a stage two cut-off line. The cut-off line is a algorithmically formulated line based on the designated percentage of the pool of users required to compete in stage two. A leaderboard, as shown in FIG. 10, indicates each team that is still eligible for the stage two competition. If the user has more than one team in the system, each team is considered independently for qualifying in stage two.

At the end of stage two, the system calculates the top scoring teams using the total points scored in the elimination round and the defined tie-breaking system and selects the top sixty-four teams for a stage three tournament. The system seeds the sixty-four from one to sixty-four based on their stage two performance and then matched up against one another with the highest ranked matched against the lowest, the second highest ranked against the second lowest, following a well-known tournament pattern until there are thirty-two pairs of teams. If the user qualifies by scoring among the top sixty-four of users in the elimination round 276, the user selects the starting line-up for a first tournament game. If the user wins, the user advances to a following week and a second tournament game and sets a starting line-up and repeats until the user loses 290 or until the user wins all six games in the tournament stage three and becomes a champion. It is understood that no system created team advances to stage three, since no system created team participates in stage two. Play stops 298 when the season is over or when the user loses a game in the tournament in a single elimination format, whichever occurs first.

Figure 4:
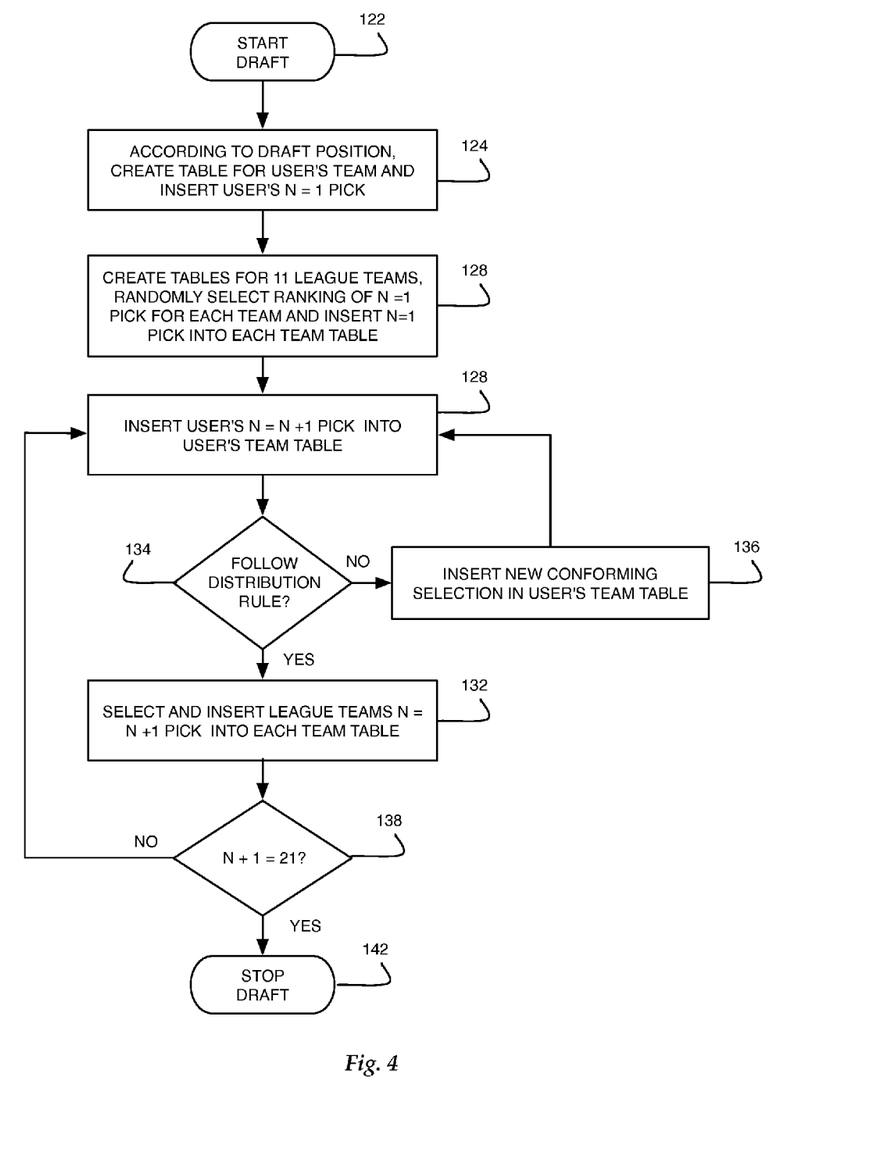
FIG. 4 is a flow chart showing the fantasy sports system creating a plurality of teams for competition in response to a user draft pick.

FIG. 4 outlines the actions of the system for drafting the eleven teams for each user team, tracking and tabulating the team rosters for all teams in the stage one league. A unique feature of the system is that for every team a user wishes to create, the system follows the actions as outlined in FIG. 4. Further, the system creates a unique set of eleven teams for each and every team a user creates, so that the outcome of competition for a first user team is independent for a second user team as explained hereinbelow.

The system starts the draft process after the user registered by creating a table for the user's team in a database 124. In this non-limiting example, the user has the first draft position. The system enters the first pick of the user in the table 124. The system also creates and links eleven additional tables for the eleven system teams 126. The system selects a first pick for each team. In order to randomize the teams, but also to create teams that are competitive, the system randomly selects a playing position, following the distribution requirements as described hereinabove and a choosing algorithm for each pick. The choosing algorithm is selected from the group including the top ranked pick for a position, a second ranked pick for a position, a third ranked pick for a position. As each selection is made, either by the system or by the user, the selected player is removed from the group of players that can be selected and the ranking of the remaining players is adjusted upward accordingly. Once the system selects players as described above, and inserting the selections 126, a single selection in each team table, a second round of drafting occurs, and a counter is incrementally increased by one to track the draft rounds. In this example, the draft process follows the serpentine pattern as mentioned hereinabove, until the draft position of the user in the second round occurs. This occurs rapidly since the system rapidly computes the algorithms to select players and does not require a slower human decision making process to fill the teams competing with the user. Because the system randomly selects the position and the choosing algorithm, different teams are created every time the drafting process is performed, even if the player can manage to select the same team twice.

The system inserts the user's selection for the second round into the table for the user teams 128. The system inserts players into the team rosters using the algorithms described hereinabove, adding one player at a time to each team roster until the system arrives at the user's draft position, inserting the user selection and continues with selecting players 132. During the drafting process the system checks that the user has selected players according to the distribution requirements for players 134. If the user selects a player that violates the distribution requirement, the system does not insert the player into the table, but issues a warning and a rejection and allows the player to reselect, inserting the new selection into the user's team table 136. The system continues until twenty rounds are complete, so that the number of rounds plus one equals twenty-one 138. When the number of rounds equals twenty, the system stops 142.

Figure 4A:
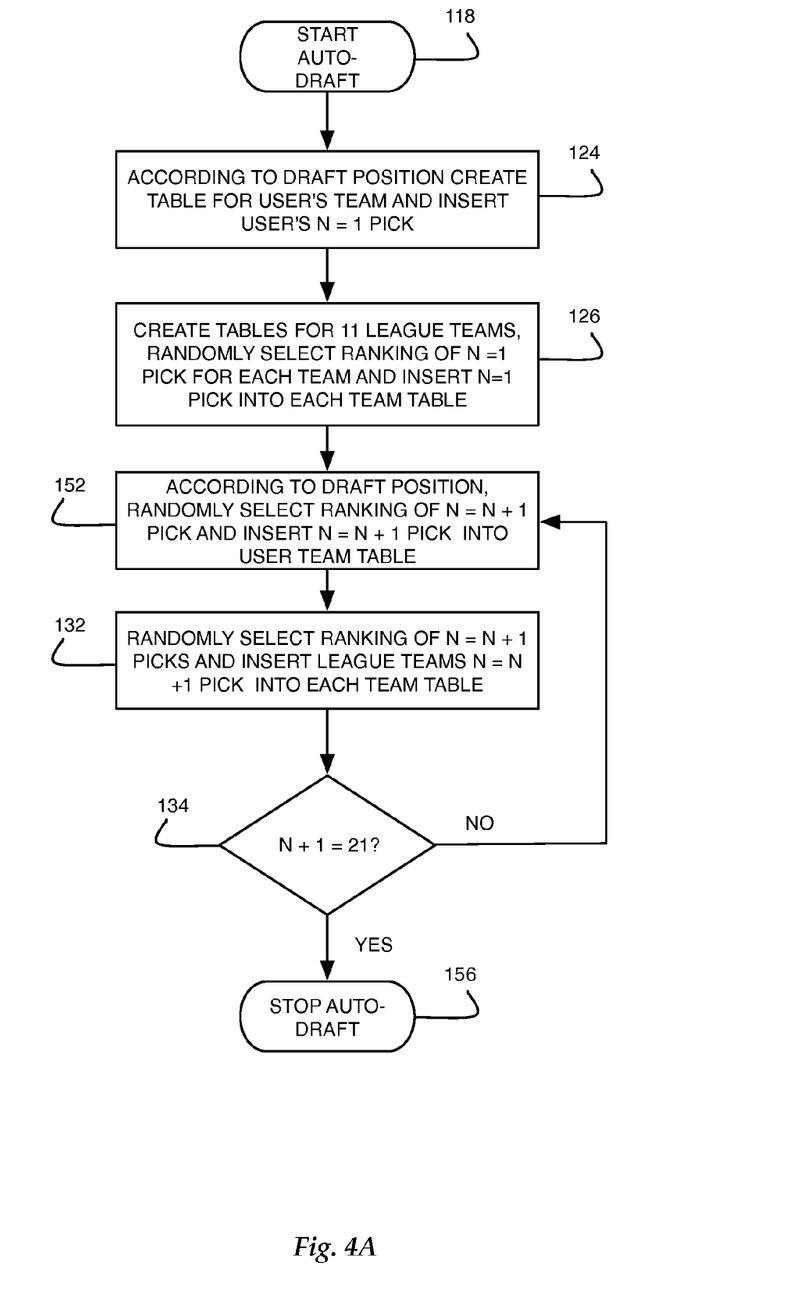
FIG. 4A is a flow chart showing the fantasy sports system creating teams for competition using an auto-draft for drafting a plurality of players for user team roster.

In another embodiment, a user who desires a more challenging experience selects an auto-draft process. The auto-draft process is similar to the draft process described hereinabove; however, the system chooses nineteen of the twenty selections for the user's team roster. FIG. 4A demonstrates the auto-draft process. The user selects the auto-draft process after registration to start the process 118. The system creates a table for the user's team roster in the database and inserts the first user's first pick 124, selected in the order of the draft position of the user. The system creates the tables and inserts the first round picks for the eleven system teams as described previously 126. The system then selects a player for the user team roster following the same method for selecting players for other league teams, randomly selecting a playing position, following the distribution requirements and randomly selecting the choosing algorithm according to the draft position of the user. The system inserts the players in the other eleven team tables until twenty rounds have been completed 132. The system continues until twenty rounds are complete, so that the number of rounds plus one equals twenty-one 138. When the number of rounds equals twenty, the system stops 142. The distribution requirement is built into the selection process so that checking the user team roster for conformance is not necessary in the auto-draft process.

Figure 1:
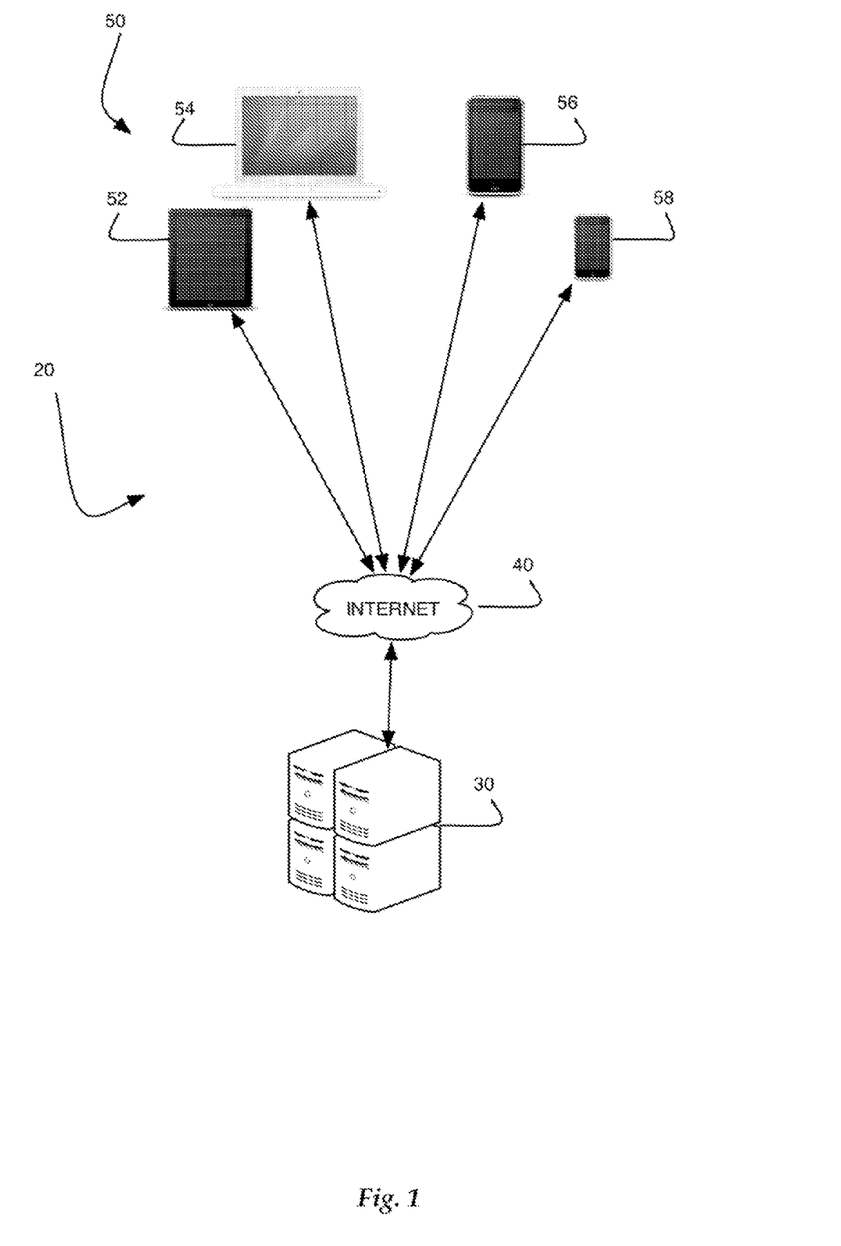
FIG. 1 is a schematic diagram of a fantasy sports system.

FIG. 1 shows a schematic diagram of a fantasy sports system 20, showing a plurality of various components for operating the system. The system has a plurality of servers 30 linked together, storing data in databases, and providing a website for the users to interact with the system and having at least one server that hosts and runs an application of the fantasy sports system. The users connect and interact with the system through the Internet 40. The user selectively connects to the Internet 40 using a personal computing device 50, such as, for example, but not limited to, a tablet computer 52, a laptop computer 54, a personal digital assistant 56, a smart phone 58, a desktop computer (not illustrated) or any other personal computing device having the means of connecting to the Internet 40.

Figure 2:
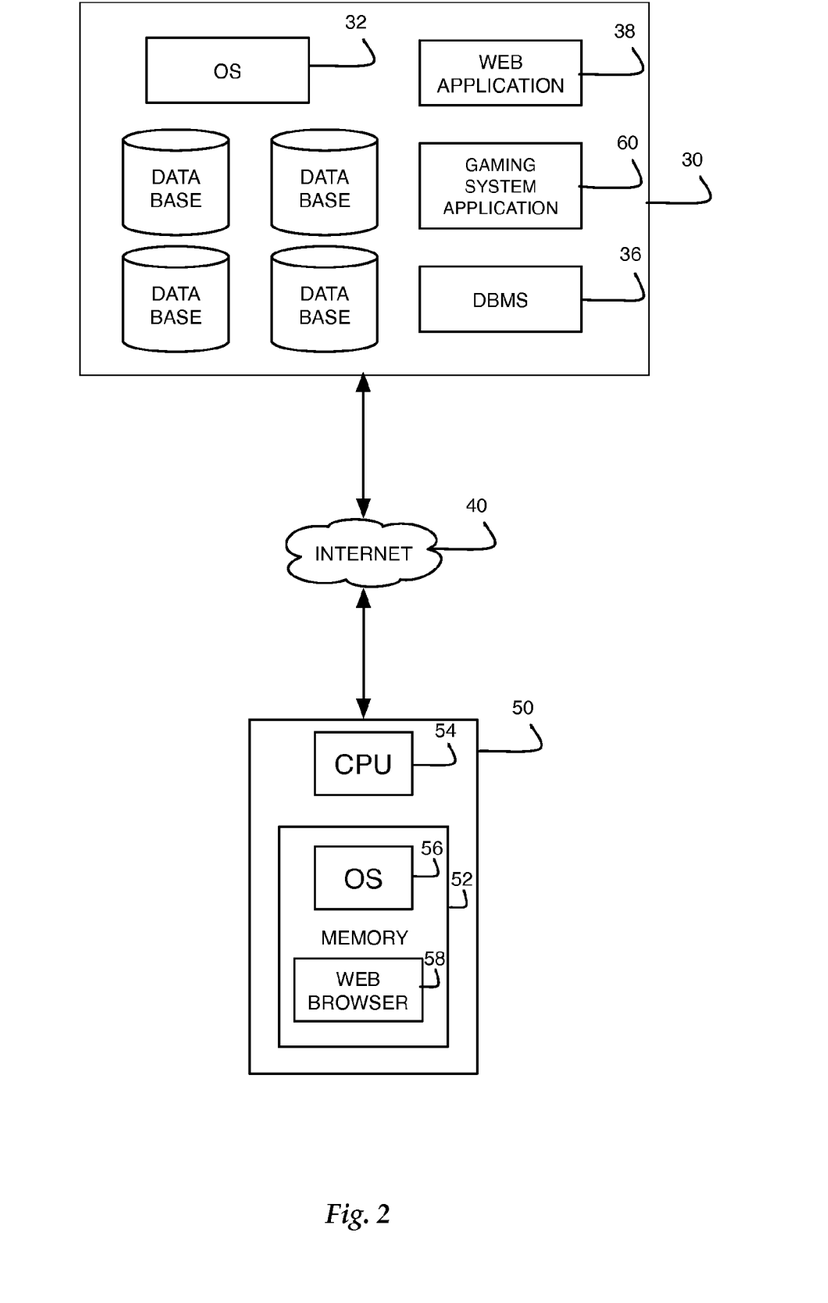
FIG. 2 is a block diagram of the fantasy sports system.

FIG. 2 is a block diagram of the fantasy sports system 20, showing the system servers 30 connecting to the personal computing device 50 of the user through the Internet 40. The system servers 30 each have software for operating the system that includes, but is not limited to, an operating system 32 with communications software for connecting to the Internet 40, drivers and other software utilities necessary for the servers to operate, which is well known to those of ordinary skill and the details of which are beyond the scope of this discussion. The servers store a plurality of databases 34 that include, but is not limited to, user data, real professional player data and statistics, real professional team data and statistics, user team rosters, system team rosters, team records, team statistics and team rankings. The servers 30 each have a database management system for the databases. The servers have a web application that communicates a plurality of web pages through the Internet 40 for display on the personal computing device of the user 50. At least one server hosts the gaming system application that has the algorithms of the system for drafting, scoring, tie-breaking and all the necessary functions to operate the fantasy sport system 20. The personal computing device 50 has a central processing unit (CPU) 54 and memory 52 holding an operating system (OS) 56 with communications software for connecting to the Internet 40, drivers and other software utilities necessary for the device to operate and a web browser 58 for displaying the web pages communicated to the device 50 from the server web application 38 through the Internet 40. It is understood that the personal computing device and the servers are not limited to these software and that other software programs on the device and servers, that are not necessary for the fantasy sport system, are beyond this discussion.

FIG. 6 through FIG. 11 illustrate a series of exemplary displays of web pages, presented to outline how a user interacts with the system. Those of ordinary skill in the art will understand that the illustrative displays are to be interpreted in an exemplary manner and that displays different from those shown and described herein can be used within the scope of the present disclosure. For example, features of the displays can be combined, separated, interchanged, and/or rearranged to generate other displays.

Figure 6:
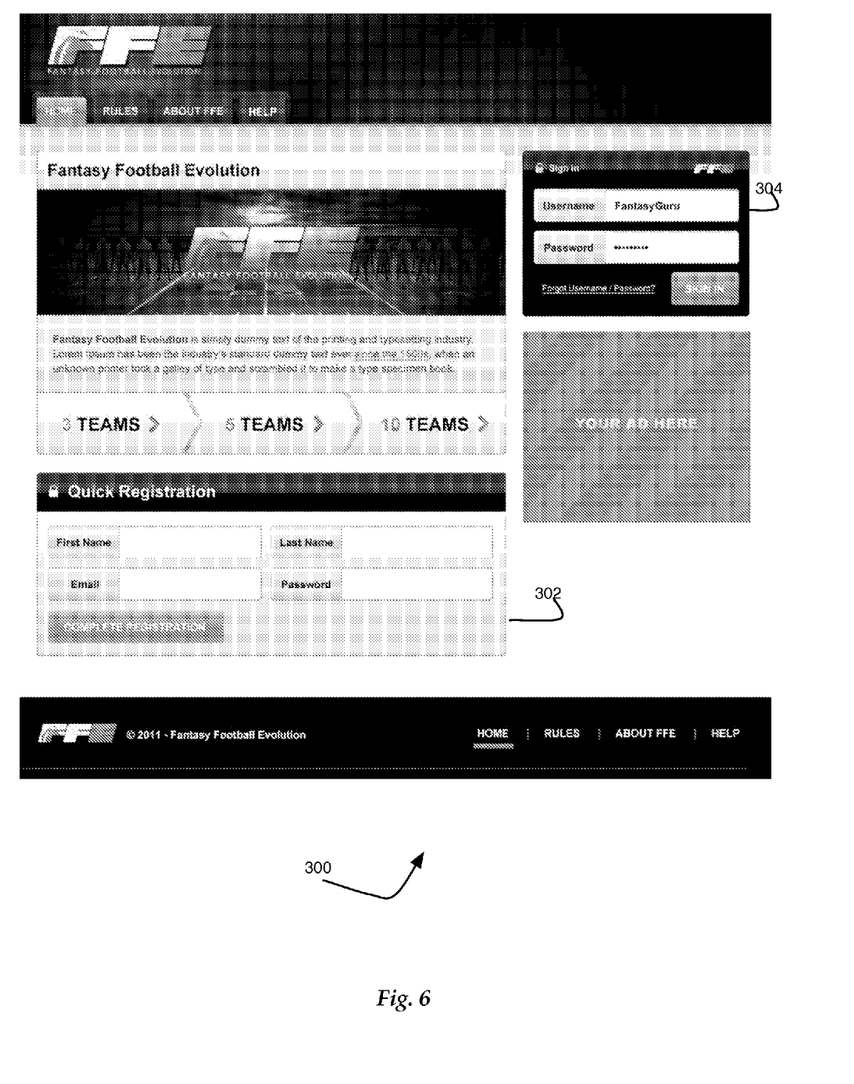
FIG. 6 is a display of an exemplary home page in a website for a fantasy football system website.
Figure 7:
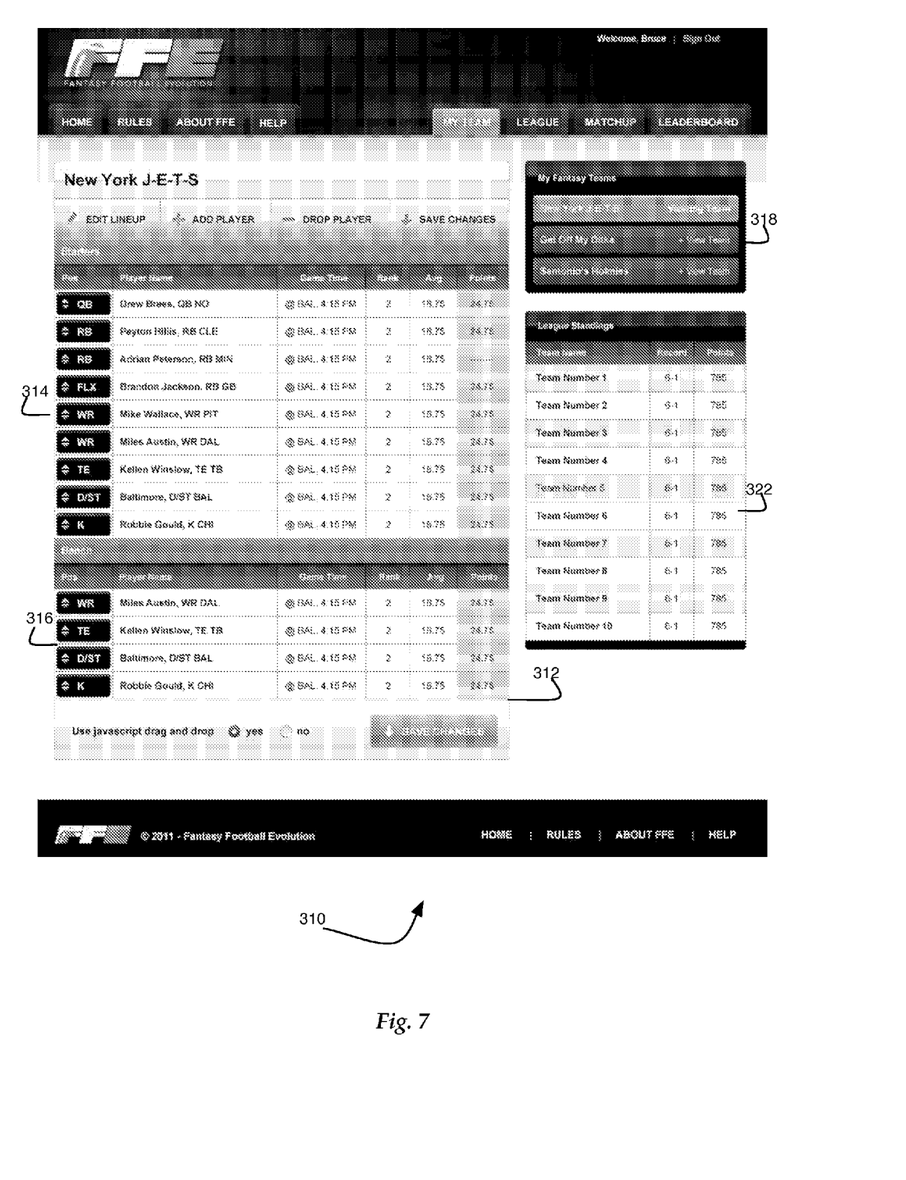
FIG. 7 is a display of an exemplary roster page in the fantasy football website.

FIG. 6 shows a screen 300 for registering a team 302 or for a user to log into the system 304. FIG. 7 displays the screen 310 with a team roster 312 with the user designating the starting line-up and the players remaining on the bench. The user can have multiple teams. To set the starting line-up for a game, the user selects the team and the roster from the user's list of teams 318. The user adds players to the line-up and designates a playing position. The system displays where the real player is playing that week, the real player's rank, and average score. After the real professional game, the system fills in the points for the week. The system displays the players on the roster who are not playing for the user that week and are on the bench 316. The web page also displays the league standings 322 for the user's team and the eleven system teams in the user's simulated league for the selected user's team.

Figure 8:
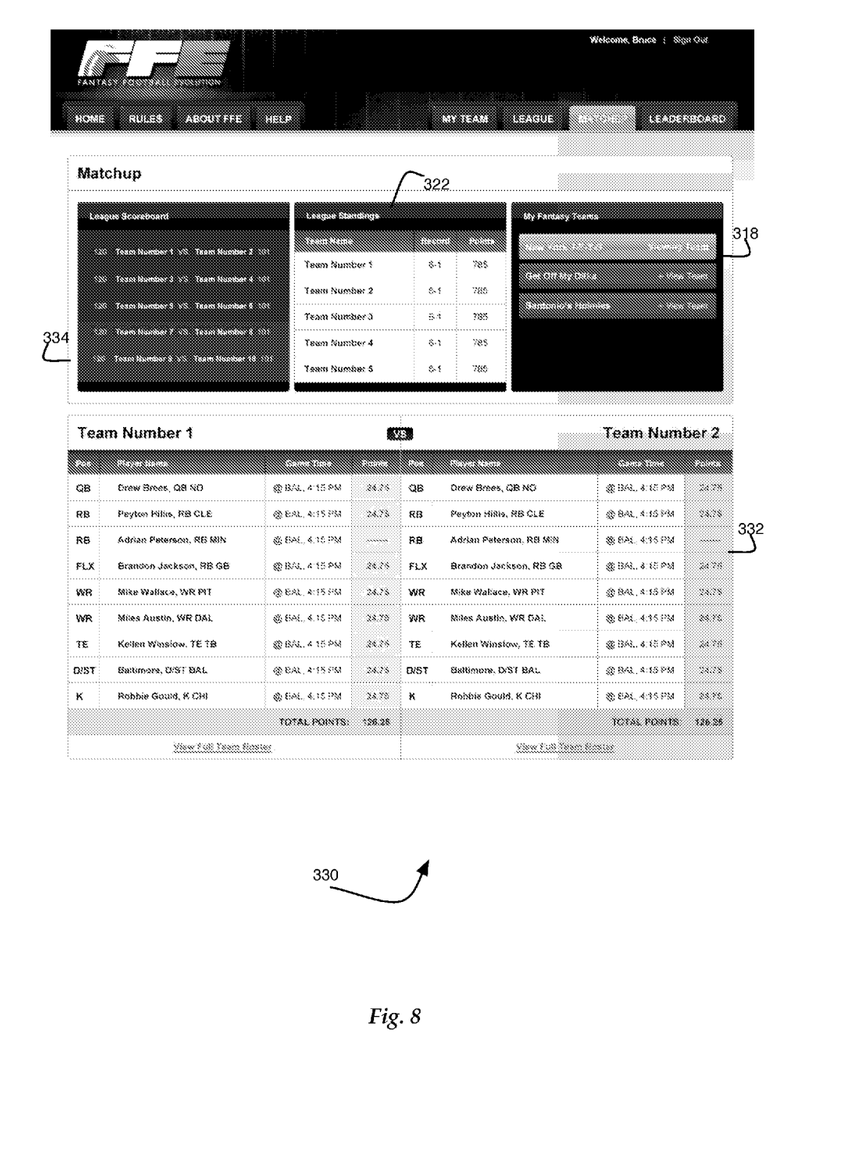
FIG. 8 is a display of an exemplary status page in the fantasy football website, showing a scoreboard, a listing of team standings, and a roster of the starting lineup for an upcoming game.

FIG. 8 displays a matchup between the user's team and a team randomly chosen by the system from the user's team simulated league. The user selects the user's team of interest 318 and the simulated league standings 322 and the league scoreboard 334 associated with the user's team is displayed. The system displays the opposing team roster, listing the real players for each team, the user team and the system-generated team 332.

Figure 9:
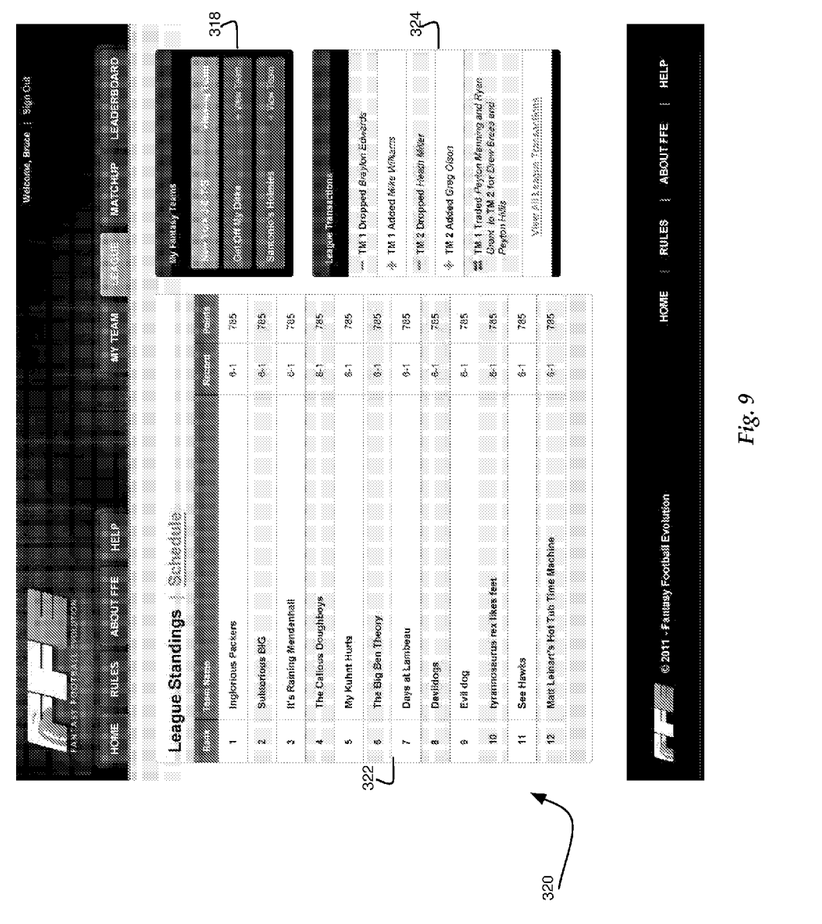
FIG. 9 is a display of an exemplary standing page in the fantasy football website, showing the listing of team standings.

FIG. 9 shows all twelve teams in the simulated league on a league web page 320, indicating the standings 322. The user selects the user team of interest 318 and only the simulated league is displayed in the standings 322. In one embodiment, the user optionally can add, drop or trade players for a different form of fantasy sport play.

FIG. 10 shows the web page 340 displaying the leaderboard of teams for all the users in the system showing the rankings of the teams for qualifying in stage two of competition in the elimination round. The user selects the user team of interest 318 and scrolls through the leaderboard 342, the user team highlighted in the ranking. The web page also shows the team standings 322 in the simulated league. The top-ranked teams on the leaderboard having the win-loss record of 8-2 or better or are in the top designated percentage move to stage two of competition.

Figure 11:
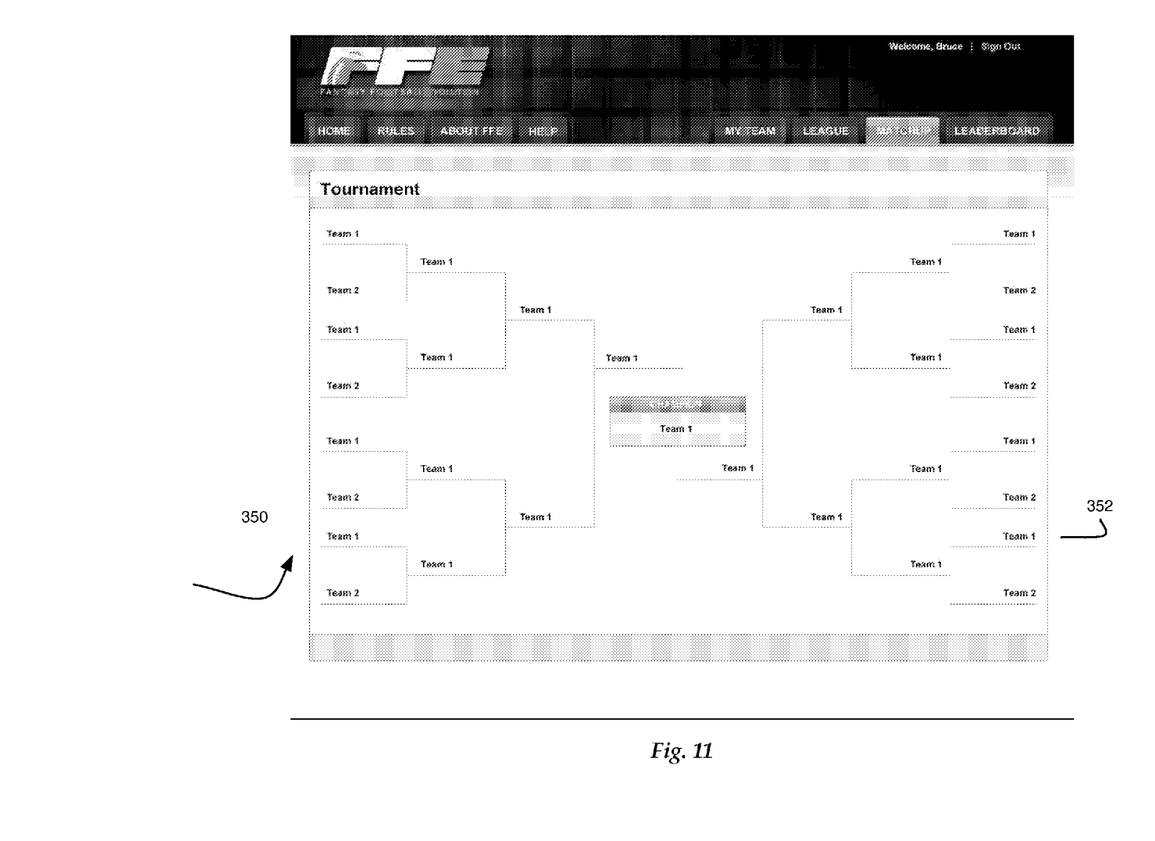
FIG. 11 is a display of an exemplary tournament page in the fantasy football website, showing a single elimination bracket system.

FIG. 11 displays the web page 350 showing the final four rounds of the tournament, showing the single elimination bracket format of competition 352. The championship tournament is stage three of the competition, leading to one champion user team, having competed against ten system created teams in stage one, against the better user teams in a single round elimination in stage two and won all six rounds in the championship tournament of stage three.

In conclusion, herein is presented an advanced system and method for playing fantasy sports that replicates league competition for a single user during a season of play by competing in a simulated league. The invention is illustrated by example in the drawing figures, and throughout the written description. It should be understood that numerous variations are possible, while adhering to the inventive concept. Such variations are contemplated as being a part of the present invention.

What is claimed is:

1. A method of playing a fantasy sport competition by a plurality of users, the users each having a personal computing device to access, through the Internet, one or more servers hosting the fantasy sport competition, comprising:
   in a first stage of the fantasy sport competition, each user individually:
   (i) drafting a user-drafted fantasy team to create a roster of a plurality of players, the user following a distribution requirement of the fantasy sport competition for a plurality of playing positions, the user drafting the plurality of players in competition against an automated system of the fantasy sport competition, the automated system drafting a plurality of system-generated fantasy teams by randomly selecting an algorithm for choosing players by rank, the automated system randomly changing the algorithm for each draft selection;
   (ii) forming a simulated league including the user-drafted fantasy team and the plurality of system-generated fantasy teams, the simulated league including a plurality of matches, wherein during each of the plurality of matches the user-drafted fantasy team competes with a randomly selected different one of the plurality of system-generated fantasy teams;

(iii) selecting a starting line-up of the plurality of players from the user-drafted fantasy team roster before a first match of the plurality of matches; and (iv) being able to adjust the starting line-up of the user-drafted fantasy team roster prior to each match of the plurality of matches; and (v) scoring a plurality of points during each match of the plurality of matches, wherein the user wins each match by scoring greater points than the system-generated fantasy team, thereby compiling a win-loss record for the user during the plurality of matches.

2. The method of playing the fantasy sport competition of claim 1, wherein each of the plurality of users forms a different simulated league, and each user compiles the win-loss record such that if a particular user of the plurality of users ranks in a top designated percentage of the plurality of users, that particular user qualifies to compete against other users ranking in the top designated percentage of all of the plurality of users in a second stage of fantasy sport competition.

3. The method of playing the fantasy sport competition of claim 2, wherein during the second stage of the fantasy sport competition, each of the users score points, such that if a user is among the top scoring sixty-four users, that user qualify for a third stage of the fantasy sport competition.

4. The method of playing the fantasy sport competition of claim 3, wherein the third stage of competition is a single elimination bracket tournament, each of the users that qualified for the third stage playing until the user loses a matchup within the bracket and is eliminated, such that an undefeated user becomes a champion.

5. The method of playing the fantasy sport competition of claim 1, wherein each user is capable of selectively drafting a plurality of user-drafted fantasy teams, drafting each user-drafted fantasy team in respective first stages of the fantasy sport competition, such that each user-drafted fantasy team is included in a different simulated league competing against a respective unique set of system-generated fantasy teams.

6. The method of playing the fantasy sport competition of claim 5, wherein the automated system drafts players for the system-generated teams by randomly selecting an algorithm for selecting players by rank, the automated system randomly changing the algorithm for each draft selection so that when each user begins drafting a user-drafted fantasy team, a unique set of system-generated fantasy teams are formed for the respective simulated league.

7. The method of playing the fantasy sport competition of claim 6, wherein the users draft each user-drafted fantasy team in a separate draft, forming a unique roster for each user-drafted fantasy team in response to the drafting of the unique set of system-generated teams by the automated system.

8. The method of playing the fantasy sport competition of claim 7, wherein the users draft a first player for a user-drafted fantasy team roster and the automated system chooses players for the user-drafted fantasy team, choosing players by randomly selecting an algorithm for selecting players by rank, the automated system randomly changing the algorithm for each draft selection to create a unique user-drafted fantasy team for the user.

9. The method of playing the fantasy sport competition of claim 8, wherein the algorithm for selecting players by rank is selected from the group consisting of top ranking player, second ranking player and third ranking player.

10. The method of playing the fantasy sport competition of claim 1, wherein the fantasy sport is selected from the group consisting of football, baseball, basketball, soccer, rugby and hockey.

11. A method of operating a fantasy sport competition using a software system, the software system having a software application hosted on one or more servers connected through the Internet to a plurality of users, the method comprising:

(i) for each of the plurality of users, generating user-drafted fantasy team roster by drafting a plurality of players by randomly selecting an algorithm for choosing players by rank, the software application randomly changing the algorithm for each draft selection, so that when the user drafts a user-drafted fantasy team by choosing the plurality of players, the software system drafts a player for one of a plurality of system-generated fantasy teams, in response to each draft selection from the user, creating a unique set of system-generated fantasy teams;

(ii) for each of the plurality of users, forming a simulated league including the user-drafted fantasy team and the unique set of system-generated fantasy teams, the simulated league including a plurality of matches, wherein during each of the plurality of matches the user-drafted team competes with a randomly selected different one of the unique set of system-generated fantasy teams;

(iii) for each of the plurality of matches, the user setting a starting line-up of the user-drafted fantasy team and the software system setting the starting line-up for the system-generated team; and (iv) determining a winner of each of the plurality of matches between the user-drafted fantasy team and the system-generated team using a plurality of algorithms for scoring points and tie-breaking to compile a win-loss record for each user during the plurality of matches for each user-drafted fantasy team during a first stage of fantasy sport competition.

12. The method of operating the fantasy sport competition of claim 11, wherein each of the plurality of users forms a different simulated league, and determining the winner for each of the plurality of matches comprises:

compiling the scored points and the win-loss record for each user and ranking the users by the scored points and win-loss record; and determining a top designated percentage of users, the top designated percentage of users qualifying to compete in a second stage of fantasy sport competition among the top designated percentage of users.

13. The method of playing the fantasy sport competition of claim 12, wherein the second stage of competition comprises:

ranking the users by points scored during the second stage of fantasy sport competition; and determining the top scoring sixty-four users playing in the second stage, the top sixty-four users qualifying to compete in a third stage of fantasy sport competition.

14. The method of playing the fantasy sport competition of claim 13, wherein the third stage of competition comprises:

assigning the qualifying users of the second stage of fantasy competition to a single elimination bracket tournament; and eliminating the user from the tournament when the user loses a matchup within the tournament, until a single undefeated user becomes a champion.

15. The method of playing the fantasy sport competition of claim 11, wherein the algorithm for selecting players by rank is selected from the group consisting of top ranking player, second ranking player and third ranking player.

16. The method of playing the fantasy sport as described in claim 11, wherein each user drafts a first player for the user-drafted fantasy team roster and the software system chooses all other players for the user-drafted fantasy team, using the randomly changing algorithm for each choice.

17. The method of playing the fantasy sport competition of claim 11, wherein the fantasy sport is selected from the group consisting of football, baseball, basketball, soccer, rugby and hockey.

* * * * *